Nov. 2, 1971
G. J. ABLAH ET AL
3,616,535
WIRE CUTTING ARTICLE
Filed Dec. 30, 1968
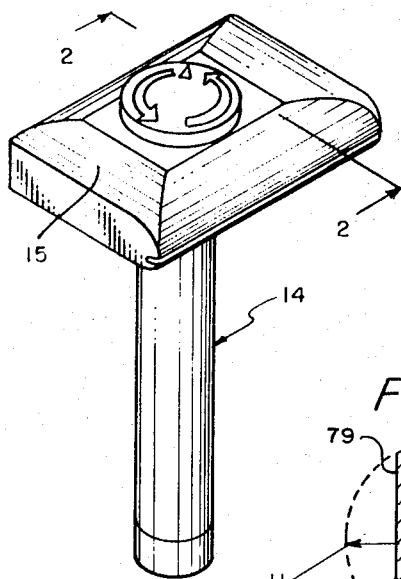
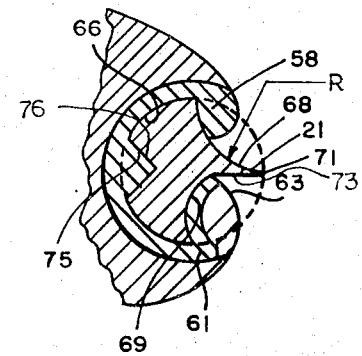
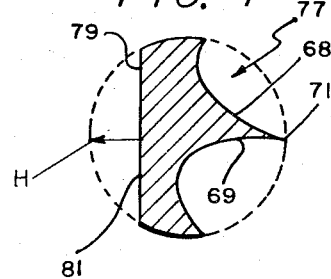
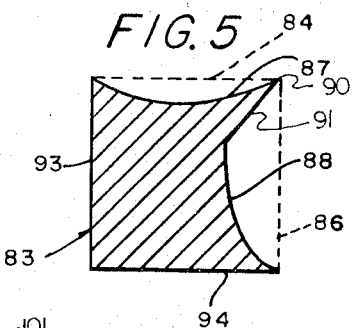
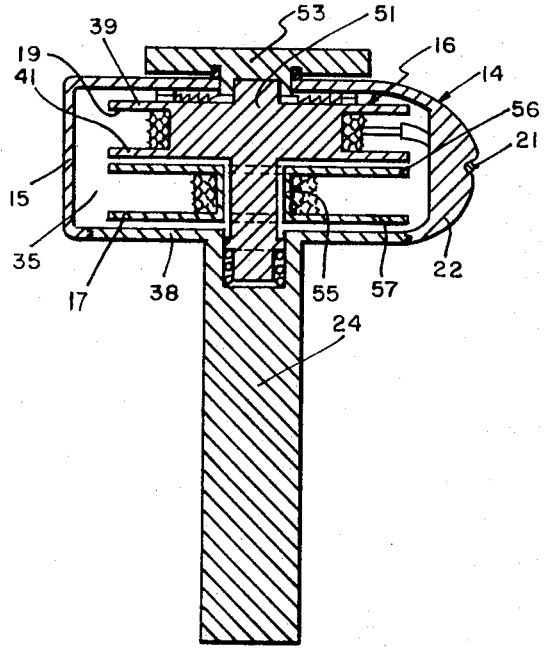
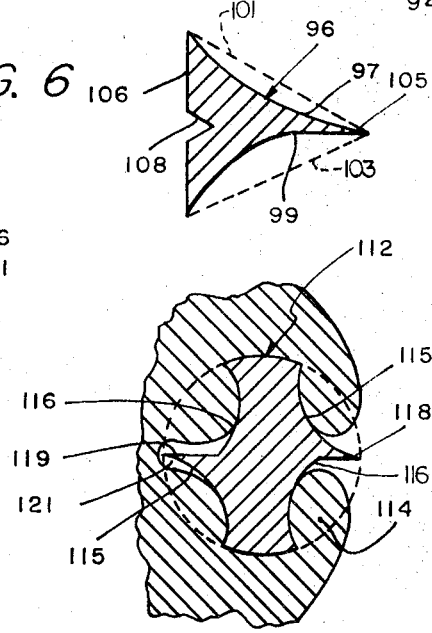
INVENTOR.
GEORGE J. ABLAH
JAMES B. TOWNSEND
BY
*John H. Wilkinson*
ATTORNEY

# United States Patent Office 3,616,535
Patented Nov. 2, 1971

3,616,535
WIRE CUTTING ARTICLE
George J. Ablah, 9100 E. 13th St. 67206, and James B. Townsend, both of Wichita, Kans.
Filed Dec. 30, 1968, Ser. No. 787,678
Int. Cl. B26b 21/26
U.S. Cl. 30—40.1                    7 Claims

ABSTRACT OF THE DISCLOSURE

This invention is a wire type cutting article operable in a magazine type razor having portions for maintaining stability and an outwardly projecting cutting edge shaped from the wire material so that the same is readily flexible in all directions adapted to be wound upon a cartridge or the like. More particularly, this invention is wire cutting articles constructed from circular, square, and triangular wires to provide at least one cutting edge therealong.

---

Numerous types of knives or blade structures are known in the prior art operable to be placed into a holding apparatus such as a razor device for use in shaving or the like. However, these prior art devices are limited in the amount of cutting edge available and are not operable to hold a large amount of cutting blade in a given cartridge with the cutting edge being stacked in a rolled up fashion.

In preferred specific embodiments of the invention, a wire cutting device is provided for shaving or the like mountable within a magazine type razor structure and adapted to be placed and rotatably mounted on a supply cartridge to selectively supply the wire cutting device to a take-up cartridge through an aligning guide channel means. The wire cutting device consists of an elongated wire having a cutting edge thereon with opposite ends connectable to the take-up cartridge from the supply cartridge, respectively, with an intermendiate portion trained through the aligning and guide channel means. The wire cutting device is threaded through the aligning guide channel means which is constructed so as to rigidly hold the same against rotational movement and frictionally resist axial movement thereof. The wire cutting device is readily flexible in all directions so as to be easily positioned in the aligning and guide channel means and expose only an elongated cutting edge therefrom. The wire cutting device can be constructed of any wire type sheet such as rectangular, square, triangular, or the like as shown in the various embodiments of this invention. The additional embodiments of the wire cutting device and corresponding aligning guide channel means of this invention are provided with interlocking portions to hold the same rigidly against rotational movement.

One object of this invention is to provide a new and novel wire cutting device overcoming the above-mentioned disadvantages of the prior art devices.

A further object of this invention is to provide a wire cutting device constructed of an elongated flexible wire material having a cutting edge which is held rigidly against rotational movement and frictionally against axial movement in a magazine type razor structure.

Still, one other object of this invention is to provide a wire cutting device which is economical to manufacture, readily stored in a compact condition on a cartridge due to its flexibility in all directions, provided with arcuate portions broken away to reveal a cutting edge therebetween requiring the least amount of material to provide a cutting edge structure, and simple to operate and use.

Various other objects, advantages, features of the invention will become apparent to those skilled in the art from the following discussion, taken in conjunction with the accompanying drawings, in which:

FIG. 1 is a perspective view of a magazine type razor having the wire cutting device of this invention mounted therein;

FIG. 2 is an elevational sectional view taken along the 2—2 in FIG. 1;

FIG. 3 is an enlarged fragmentary sectional view of a wire cutting device as mounted in a guide channel of the magazine type razor of this invention;

FIGS. 4, 5 and 6 inclusive are enlarged cross sectional views of various embodiments of the wire cutting device of this invention; and FIG. 7 is a view similar to FIG. 3 illustrating another embodiment of the wire cutting device of this invention as mounted in a guide channel of the razor of this invention.

The following is a discussion and description of preferred specific embodiments of the razor of this invention, such being made with reference to the drawings, whereupon the same reference numerals are used to indicate the same or similar parts and/or structure. It is to be understood that such discussion and description is not to unduly limit the scope of the invention.

Referring to the drawings in detail and particular FIG. 1, a razor, indicated generally at 14, includes a support or housing means 15 having a cartridge means 16 comprised of a supply cartridge or spool 17 and a take-up cartridge 19 rotatably mounted therein to carry and select the transfer of the elongated wire cutting device 21.

More particular, as shown in FIG. 2, the housing means 15 includes a main body 22 to which is releasably connected to handle member 24 so as to outwardly resemble a conventionally available safety razor structure. The main body 22 is of rectangular shape in transverse cross section having an enlarged access opening whereupon it is seen that the main body 22 defines an inner enlarged cavity 35. The area about the opening can be formed to receive a closure plate 38 in a snap-in operation to provide a rigid, waterproof sealed structure.

The take-up cartridge 19 has a central spool with a pair of parallel retainer walls 39 and 41 and extending laterally of a retainer wall 46 is a stub shaft 51 adapted to receive a knob member 53 thereon.

The supply cartridge 17 is also of a spool shape having a hub section 55 to which is connected laterally extended parallel guide walls 56 and 57. The take-up cartridge 19 and the supply cartridge 17 are mounted within the enlarged cavity 35 with the wire cutting device 21 carried on the hub section 55 and trained through an aligning and guide channel means 58 of the main body 22 and connected to the take-up cartridge 19. It is seen, therefore, that rotation of the knob member 53 operates to move the wire cuting device 21 from the supply cartridge 17 through the aligning guide channel means 58 onto the take-up cartridge 19 as will be further explained in detail.

As shown in FIGS. 2 and 3, the aligning and guide channel means 58 includes a guide channel 61 mounted within the front wall so as to have a blade slot 63 open forwardly and outwardly therefrom. The guide channel 61 is constructed of an irregular shaped rigid material preferably mounted during the mold manufacturing processes of the housing means 15. The guide channel 61 extends the entire length of the front wall having opposite end sections curved inwardly to properly guide the wire cutting device 21 towards the take-up cartridge 19 from the supply cartridge 17. The guide channel 61 is also formed with an inner irregularly shaped slot or groove 66 adapted to receive the corresponding sized and shaped wire cutting device 21 to prevent rotational movement and frictionally resist the axial movement thereof.

More particularly, as shown in FIG. 3 the wire cutting device 21 is formed from an elongated flexible wire of generally circular shape in transverse cross section having cooperating arcuate portions 68 and 69 cut away to leave an elongated cutting edge 71. The lower arcuate portion 69 has an upper portion 73 extended substantially horizontally aligned with a radius of the wire to provide for the proper cutting edge 71. The arcuate portion 68 has a radius equal to that of the wire indicated at "B" and intersects the same at a quarter section to provide the best in cutting edge and rigidity. Diametrically opposed to the cutting edge 71 is a V-shaped cut-out portion 75 adapted to fit in a similarly shaped protrusion 76 in the inside surface of the guide channel 61 to prevent rotation of the wire cutting device 21 therein. It is seen in FIG. 3 that the wire cutting device 21 fits in nesting engagement with a substantial inner surface portion of the guide channel 61 and the cutting edge 71 extends forwardly and outwardly of the slot 63 as in a conventional razor. This snug fit operates to hold the circular wire type cutting device 21 against rotational movement and frictional contact of the abutting surfaces holds the same against axial movement except on rotation of the knob member 53.

In another preferred embodiment of a wire cutting device 77 as shown in FIG. 4, the same is formed from a circular wire, similar to the wire cutting device 21, having an identical cutting edge 71 and arcuate portions 68 and 69. A chordal portion 79 is cut away to leave a flat surface 81 extended perpendicular to the cutting edge 71. The chordal height indicated at H is equal to one-half the radius of the wire for the most in rigidity in combination with strength of the cutting device 77. It is seen that this structure will provide a rigid surface, namely the surface 81, to receive the inward pressure against the cutting edge 71 and operable with a similarly shaped guide channel (not shown) to prevent rotation of the wire cutting device 77 in a similar manner previously explained for the other wire cutting device 21.

Another embodiment is shown in FIG. 5 having a wire cutting device 83 formed from a square wire in transverse cross section with adjacent sides 84 and 86 cut away by arcuate portions 87 and 88, respectively to form a cutting edge 90. The arcuate portion 88 includes a horizontal portion 91 aligned with a diagonal of the square wire for best results. Rigidity and stability is achieved by the other sides 93 and 94 mounted within a correspondingly shaped guide channel (not shown).

Another embodiment of a wire cutting device 96 is shown in FIG. 6 whereupon an isoseles triangular shaped wire is formed with arcuate portions 97 and 99 cut out of the sides 101 and 103 of identical length, respectively, to form a cutting edge 105. The third side 106 is formed with a V-shaped notch 108 to fit within a similarly shaped protrusion in a corresponding guide channel (not shown) similar to that previously described for the other cutting device 21.

Still, another embodiment of a wire cutting device 112 is shown in FIG. 7 whereupon the same is constructed from a circular wire in transverse cross section and mounted within a specially designed channel 114. The wire cutting device 112 is provided with opposed pairs of coperating arcuate portions 115 and 116 having the arcuate portions 116 with a greater amount removed to provide opposed cutting edges 118 and 119. It is seen that the guide channel 114 provides for extension of the cutting edge from one side and a cavity 121 on the other side to receive the other cutting edge 119. It is obvious that this wire cutting device 112 is operable on reversing from the position as shown in FIG. 7 to provide with dual cutting edges 118 and 119 for the utmost in efficiency and effectiveness from a given wire structure.

It is obvious that the wire cutting devices 21, 77, 83, 96, and 112 will operate and function as previously described with the razor 14 with the primary concern being (1) the provision of a proper interlocking contour to prevent rotation of the respective wire cutting device within its corresponding guide channel; (2) providing engaging surfaces to frictionally resist axial movement of the respective cutting device during usage and only permit movement with rotation of the corresponding knob member; and (3) having the wire cutting device readily flexible in all directions so as to be usable similar to a conventional wire structure for easy storage and handling. It is seen that the various arcuate portions of the various wire structures of this invention are of importance to achieve the overall efficiency and effectiveness of the wire cutting devices.

The use of the wire cutting device allows a new cutting edge to be used each time while having a supply of edges enough to last a year or longer within the magazine type razor. It is obvious that the use of a stainless steel wire will allow the wire cutting device to last indefinitely and the cost of the wire cutting device is considerably less than conventional razor blades. The new and novel magazine type razor of this invention with the wire cutting device provides safety to the users as the external disposal of the cutting edge is not required.

Furthermore, it is seen that the use of a wire having a cutting edge therealong presents a new and novel cutting tool which can readily be dispensed from a continuous wire spool. The wire cutting device can be readily dispensed in any given length from a cartridge similar to the conventionally available razor blade dispensers of today.

As will be apparent from the foregoing description of the preferred embodiments of the applicants wire cutting devices, relatively simple and inexpensive structures are provided easily operable and maintainable so as to provide a new and novel cutting device. The applicant's construction eliminates a great deal of time consuming and somewhat hazardous work involved in changing cutting structures in the razor and results in substantial monetary savings in material cost. It is obvious that the wire cutting device of this invention could be manufactured and sold at a substantial savings relative to the prior art devices now available.

While the invention has been described in conjunction with preferred specific embodiments thereof, it will be understood that this description is intended to illustrate and not to limit the scope of the invention, which is defined by the following claims.

We claim:
1. A wire cutting device usable in a magazine type razor structure having a guide channel adapted to receive and support the wire cutting device with a portion open outwardly therefrom, comprising:
   (a) said wire cutting device including arcuate portions to form a cutting edge at the mating portions and having a cooperating portion opposed to said cutting edge to be received within said guide channel whereby said wire cutting device is held against rotational movement thereby providing for the proper angle and position of said cutting edge at all times, and
   (b) said cooperating portion being of an irregular shape to mate with a similar cooperating irregular shape in said guide channel to prevent any rotational movement.

2. A wire cutting device as described in claim 1, wherein:
   (a) said wire cutting device having outermost portions thereof conforming to a circular wire in transverse cross section, and
   (b) said cooperating portion being of V-shape mating with a V-shaped projection in said guide channel.

3. A wire cutting device as described in claim 2, wherein:
   (a) said wire cutting device having one of said arcuate portions cut away with an outermost section aligned with a radius to provide an effective said cutting edge.

4. A wire cutting device as described in claim 3, wherein:
   (a) another one of said arcuate portions having a radius equal to that of the circular wire intersecting a quarter section thereof.

5. A wire cutting device as described in claim 1, wherein:
   (a) said wire cutting device of square shape in transverse cross section having complementary arcuate portions cut away to form said cutting edge therebetween, and
   (b) one of said arcuate portions extended substantially horizontally adjacent said cutting edge to achieve the proper working relationship for same.

6. A wire cutting device as described in claim 1, wherein:
   (a) said wire of generally isosceles triangular shape in transverse cross-section having said cooperating portion being a V-shaped notch portion directly opposite the formation of said cutting edge for locking engagement with said guide channel.

7. A wire cutting device as described in claim 1, wherein:
   (a) said wire cutting device having a generally circular outline having pairs of opposed arcuate portions cut away defining between cooperating ones cutting edges and between adjacent arcuate portions provided with radial locking areas to be engaged with said guide channel,
   (b) said cutting edges diametrically opposed whereupon said wire cutting device is operable for cutting on opposite sides.

References Cited
UNITED STATES PATENTS

| | | | |
|---|---|---|---|
| 3,360,856 | 1/1968 | Townsend et al. | 30—40.1 |
| 3,363,312 | 1/1968 | Fayed | 30—40.1 |
| 896,383 | 8/1908 | Hartness | 30—51 |

GRANVILLE Y. CUSTER, Jr., Primary Examiner